United States Patent [19]

Reimers et al.

[11] Patent Number: 5,048,451
[45] Date of Patent: Sep. 17, 1991

[54] VEHICLE CAUTION SIGN

[75] Inventors: Walter H. Reimers, Ithaca; Gerald Muirhead, Watkins Glen, both of N.Y.

[73] Assignee: CHR Industries, Inc., Ithaca, N.Y.

[21] Appl. No.: 503,519

[22] Filed: Apr. 2, 1990

[51] Int. Cl.⁵ .................. B60Q 1/26; B60Q 1/34; B60Q 1/54; G09F 7/22
[52] U.S. Cl. .................. 116/35 A; 116/37; 116/35 R; 40/591; 40/602
[58] Field of Search .......... 116/35 R, 37, 35 A, 116/28 R, 51, 39, 264, 265; 40/591, 602, 617, 622

[56] References Cited

U.S. PATENT DOCUMENTS

| | | | |
|---|---|---|---|
| 1,172,104 | 2/1916 | Black | 116/51 |
| 1,635,915 | 7/1927 | White | 116/35 R |
| 1,704,774 | 3/1929 | Svec | 116/51 |
| 2,066,641 | 1/1937 | Melior et al. | 116/28 R |
| 2,711,613 | 6/1955 | Brown | 116/51 |
| 2,880,408 | 3/1959 | Sewell | 116/37 |
| 2,933,841 | 4/1960 | Lawlor | 116/28 R |
| 3,672,323 | 6/1972 | Hawes | 116/28 |
| 3,703,152 | 11/1972 | Morton | 116/28 R |
| 3,762,360 | 10/1973 | Hawes | 116/28 R |
| 3,788,268 | 1/1974 | Hiatt et al. | 116/28 R |
| 3,975,849 | 8/1976 | Tuleja . | |
| 3,982,771 | 9/1976 | Tropeano | 116/35 R |
| 4,028,829 | 6/1977 | Murray | 116/35 R |
| 4,321,883 | 3/1982 | Ruppa | 116/35 A |
| 4,348,978 | 9/1982 | Brucato | 116/28 R |
| 4,483,586 | 11/1984 | Sisto | 116/35 A |
| 4,546,562 | 10/1985 | Jones | 40/591 |
| 4,793,082 | 12/1988 | Petrick et al. | 40/617 |
| 4,881,565 | 11/1989 | Turk | 40/617 |

*Primary Examiner*—William A. Cuchlinski, Jr.
*Assistant Examiner*—C. W. Fulton
*Attorney, Agent, or Firm*—G. J. Muckenthaler

[57] ABSTRACT

A vehicle safety or caution sign is attached to the side of a vehicle. The sign is held by an elongated member which is coupled by a first pivot to a mounting member that attaches to the vehicle. The first pivot enables the sign to be swung in a fore and aft direction relative to and toward and from the vehicle. The sign has a bearing member secured thereto and which operates as a second pivot and is coupled with the elongated member to enable the sign to hang in a generally vertical position when the vehicle is moving at a slow speed or is stopped, and to enable swinging of the sign to a generally horizontal position when the vehicle is moving in excess of a predetermined speed.

19 Claims, 3 Drawing Sheets

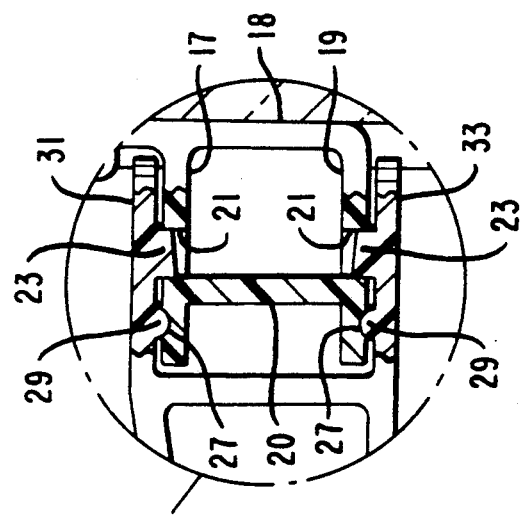
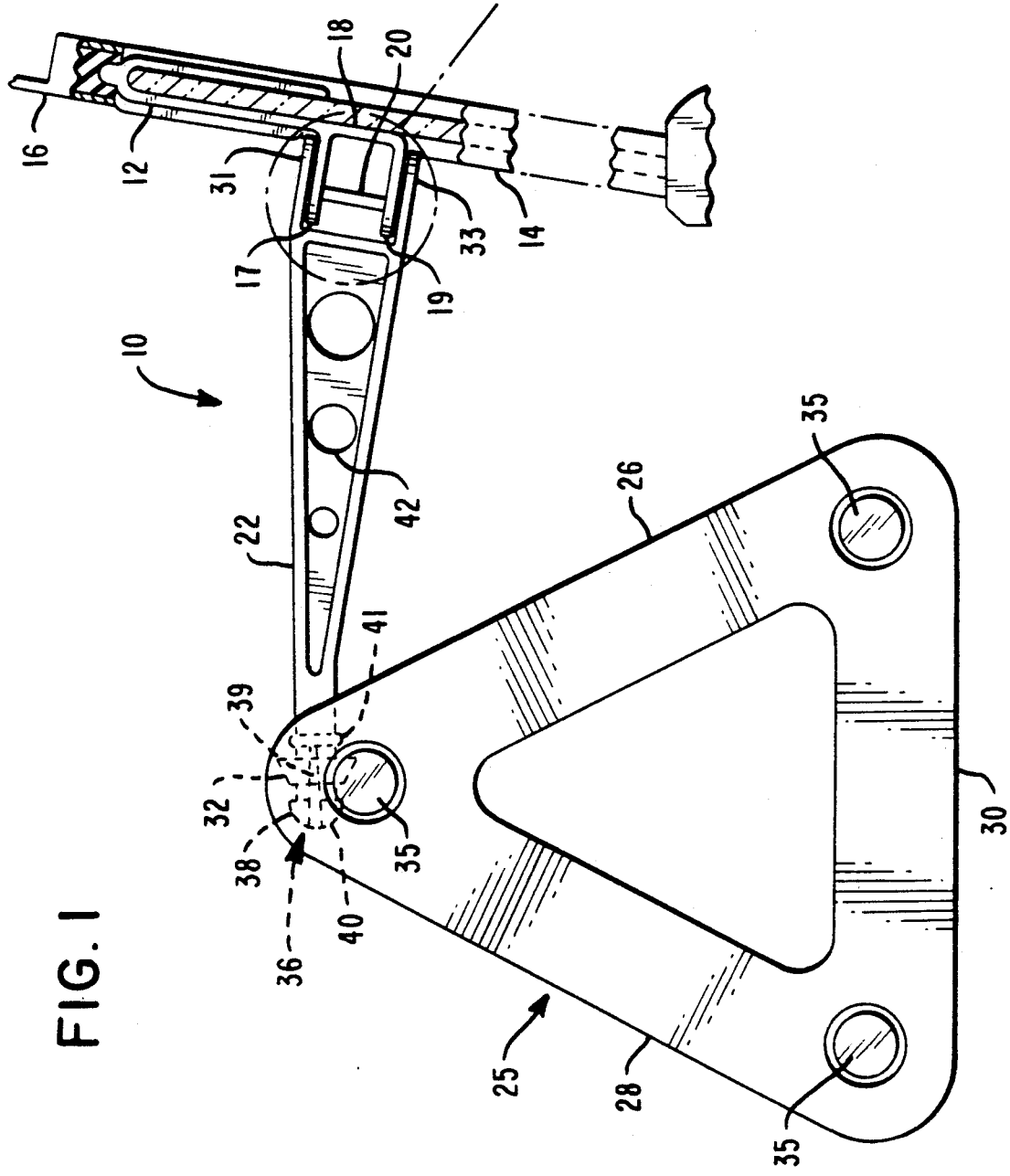
FIG. 1
FIG. 2

VEHICLE CAUTION SIGN

BACKGROUND OF THE INVENTION

In the field of vehicular travel, it is commonly known that when certain unexpected conditions occur, the driver of the vehicle provides a warning or signal to the other drivers on the road. One common means of providing such warning or signal is to attach a colorful flag or the like to the radio antenna on the vehicle. This warning or signal may indicate that the trouble may be an emergency condition or it may be a distress signal to warn approaching drivers of other vehicles.

In the case of large trucks, it is common practice to place flares in an angled pattern along the road in the front and in the rear of the truck to indicate a stopped truck. The use of flares usually means that the truck will be parked for a period of time, perhaps for several hours. The flares are readily seen at night by approaching drivers by reason of the bright color. In the daytime, the flares do not show up as well but the large truck is readily seen.

It is also known that a slowing or braking vehicle displays taillights to warn drivers at the rear of such vehicle. The taillights show up much better at night but they do provide a signal by day. Recently, an additional brake-indicating light has been provided in the rear windshield of automobiles and certain other vehicles and also placed at a higher elevation than the regular brakelights to better display a braking signal at the rear of such vehicle.

In the case of a braking vehicle, the display from the brakelights provides adequate warning to the driver at the rear that the vehicle ahead is slowing down at a determined and desired rate. If the driver in front is slowing down without the use of brakes, there is no indication of such slowing to the driver at the rear. If such driver in the rear vehicle is not fully attentive to driving, there may be an accident when the rear vehicle is following too closely.

It is also known that in rural areas and in hilly country, there may be an unusual number of slower moving vehicles, such as pickup trucks or other heavily loaded trucks. It is not uncommon to drive over the crest of a hill and confront a slow moving vehicle just ahead or even one that has stopped on or at the side of the road. In some cases, it is readily seen that a slow moving vehicle or a stopped vehicle may not have any indication as to the speed or the movement of such vehicle. Under these conditions, some means of warning or signalling should be given to drivers approaching the slow moving or stopped vehicle.

Representative documentation in the area of signals or warning devices includes U.S. Pat. No. 2,933,841, issued to T. J. Lawlor on Apr. 26, 1960, which discloses a highway distress signal having an elongated panel section, an integral bearing section foldable to engage a vehicle window, and a locking section integral and foldable with respect to the bearing section and having locking engagement with the panel section to dispose the panel section outwardly.

U.S. Pat. No. 3,672,323, issued to E. L. Hawes on June 27, 1972, discloses a triangular-shaped emergency sign assembly having a lower part fixed to a clip that is attached to a car window and having an upper part for supporting the sign. The sign is adjustable about two axes, one being a horizontal pivot and the other being a vertical pivot to accommodate different roof and window structures.

U.S. Pat. No. 3,703,152, issued to P. S. Morton on Nov. 21, 1972, discloses a vehicle distress signalling device which is triangular shaped and includes a pivot for unfolding from an elongated housing to display the device on the side of the vehicle.

U.S. Pat. No. 3,762,360, issued to E. L. Hawes on Oct. 2, 1973, discloses a vehicle sign assembly having a lower part fixed to a clip attached to a car window and having an upper part for supporting the sign. A universal joint is provided to couple the lower and upper parts into any desired position and then locked therein. A modification enables the sign to easily rotate about the upper part.

U.S. Pat. No. 3,975,849, issued to A. Z. Tuleja on Aug. 24, 1976, discloses a reflecting triangular warning device wherein a sign has holes for receiving pins of a removable display and has horizontal and vertical stub pins for supporting the sign in different manner.

SUMMARY OF THE INVENTION

The present invention is directed to a vehicle safety or caution sign that is attached to the side of the vehicle to indicate slowing of the vehicle or to indicate a stopped vehicle. The sign is mounted on the window of the vehicle door and includes a first pivot to enable swinging of the sign from one position to another position relative to the vehicle. The sign has a second pivot to enable swinging of the sign from a vertical position to a horizontal position dependent upon movement of the vehicle. When the vehicle is traveling in excess of about five miles per hour, the sign assumes a generally horizontal position and is not readily seen by the driver of another vehicle following the vehicle with the sign, or by an approaching driver of another vehicle. When the vehicle with the sign slows to less than five miles per hour, the sign swings down to a vertical position and is readily seen by the driver in the rear vehicle and also by an approaching driver in another vehicle from the front. In this manner, the sign provides a warning to other motorists of the slowing down or stopping of the vehicle.

In accordance with the present invention, there is provided a caution sign for use on a vehicle comprising means for mounting the sign to the vehicle, holding means pivotally coupled with the mounting means and extending outwardly therefrom, and means secured to the sign and pivotally coupled with the holding means, said sign being disposed in a generally vertical position when the vehicle is not moving and said sign pivoting to a generally horizontal position when the vehicle is moving at a predetermined speed.

In view of the above discussion, a principal object of the present invention is to provide a caution sign on a vehicle to indicate slowing down of the vehicle.

Another object of the present invention is to provide a caution sign that is easily swung from an operating position to a non-operating position against the side of the vehicle when the sign is not in use.

An additional object of the present invention is to provide a caution sign which is supported from the vehicle and provides an indication to other motorists of a slowing down of the vehicle.

A further object of the present invention is to provide a vehicle safety or caution sign that is swingable to one position when the vehicle is traveling above a certain speed and is swingable to another position when the vehicle is slowing or approaching a stopped condition or is stopped.

Additional advantages and features of the present invention will become apparent and fully understood from a reading of the following description taken together with the annexed drawing.

BRIEF DESCRIPTION OF THE DRAWING

FIG. 1 is an elevational view of a preferred embodiment of the caution sign and incorporating the subject matter of the present invention;

FIG. 2 is an enlarged view, partly in section, of bearing means and detenting means operable in pivoting or swinging action of the caution sign;

DESCRIPTION OF THE PREFERRED EMBODIMENT

Figure 3:
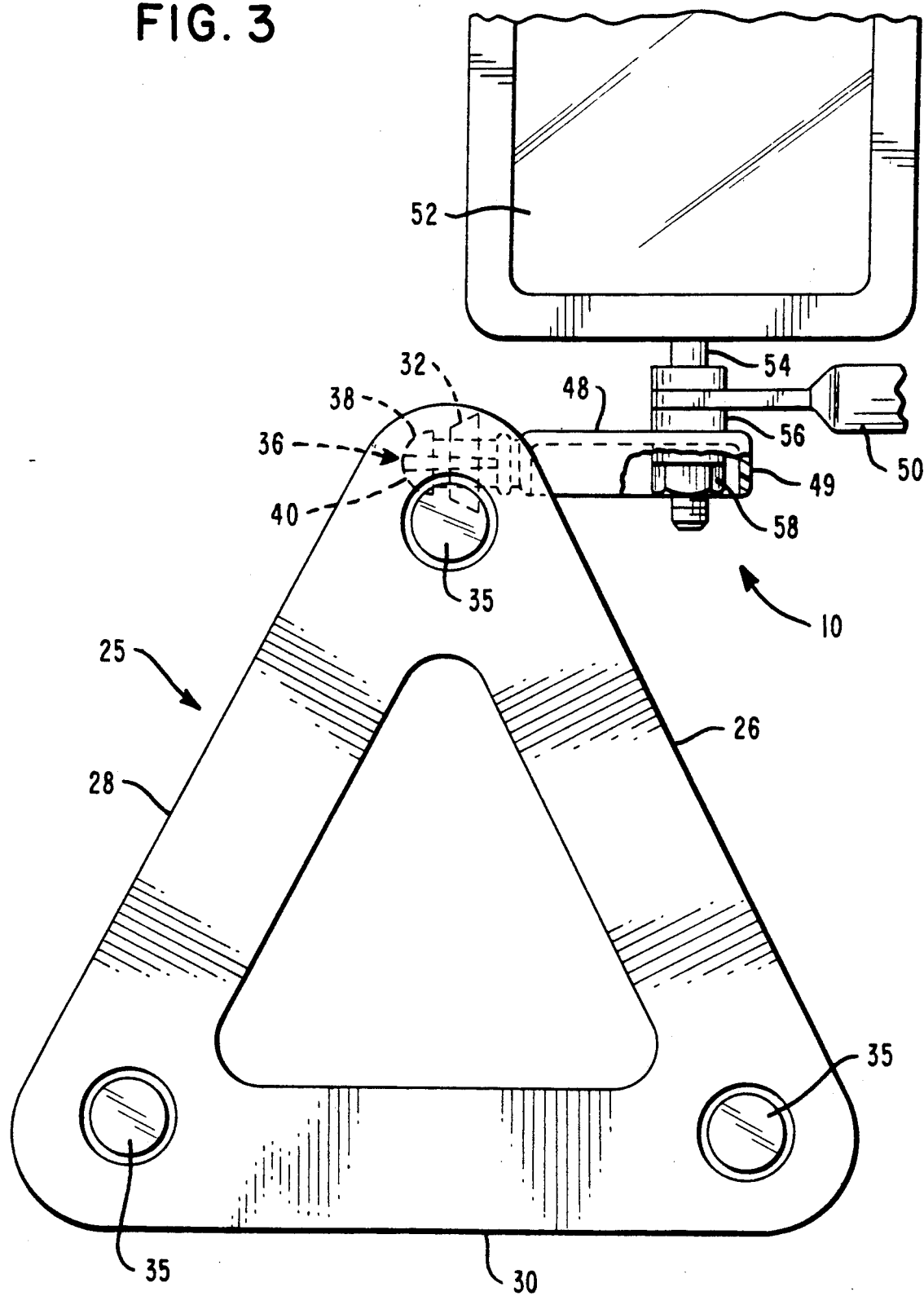
FIG. 3 is an elevational view of a modification of the means for supporting the caution sign.

Referring to the drawing, FIG. 1 shows an elevational view of a safety or caution sign assembly, generally designated as 10, which is supported by means of an inverted U-shaped clip or bracket 12 that fits over the upper portion of a window 14 of a vehicle 16. The vehicle 16 may be a van, a truck or a passenger car. The bracket 12 is an integral part of a bearing member 18 (FIG. 2). The bearing member 18 is bifurcated in form at the outer end thereof and includes a spacer 20 molded as an integral part of the bifurcated portions 17 and 19. Each of the bifurcated portions 17 and 19 of the bearing member 18 has an aperture 21 therein for receiving a stud 23. Each of the bifurcated portions 17 and 19 also has a dimple or recess 27 therein for receiving a button or rounded projection 29.

A horizontally-disposed arm 22 has a bifurcated end formed of portions 31 and 33 (FIGS. 1 and 2) fitting with the bifurcated portions 17 and 19 of the bearing member 18. The arm 22 supports a triangular-shaped sign 25. The bearing member 18 and the portions 31 and 33 of the arm 22 are designed to provide detenting or locking arrangement of the two parts in the position of the sign 25, as shown in FIG. 1. The button 29 of each of the respective portions 31 and 33 (FIG. 2) and the recess 27 of each of the respective portions 17 and 19 provide the detenting or locking arrangement of the arm 22 and the bearing 18 of the bracket 12 (FIG. 1). The sign 25 may be swung into a position against the side of the vehicle 16 when it is not desired to use the sign. The detenting feature maintains the sign 25 in the outward position unless overcome by urging or repositioning of the sign by the driver of the vehicle 16. The end portions 31 and 33 of the arm 22 are of sufficient flexibility to enable such repositioning of the sign 25.

The sign 25 is triangular shaped and includes two equal sides 26 and 28, and a lesser length side 30 (FIG. 1). The sign 25 is made of plastic of about 9¼ inches in length. The side 30 is about 8¾ inches in length. The color of the sign is orange and of a shade to be readily visible. Reflectors 35 are incorporated into all three corners of the sign 25 to enhance visibility.

Figure 4:
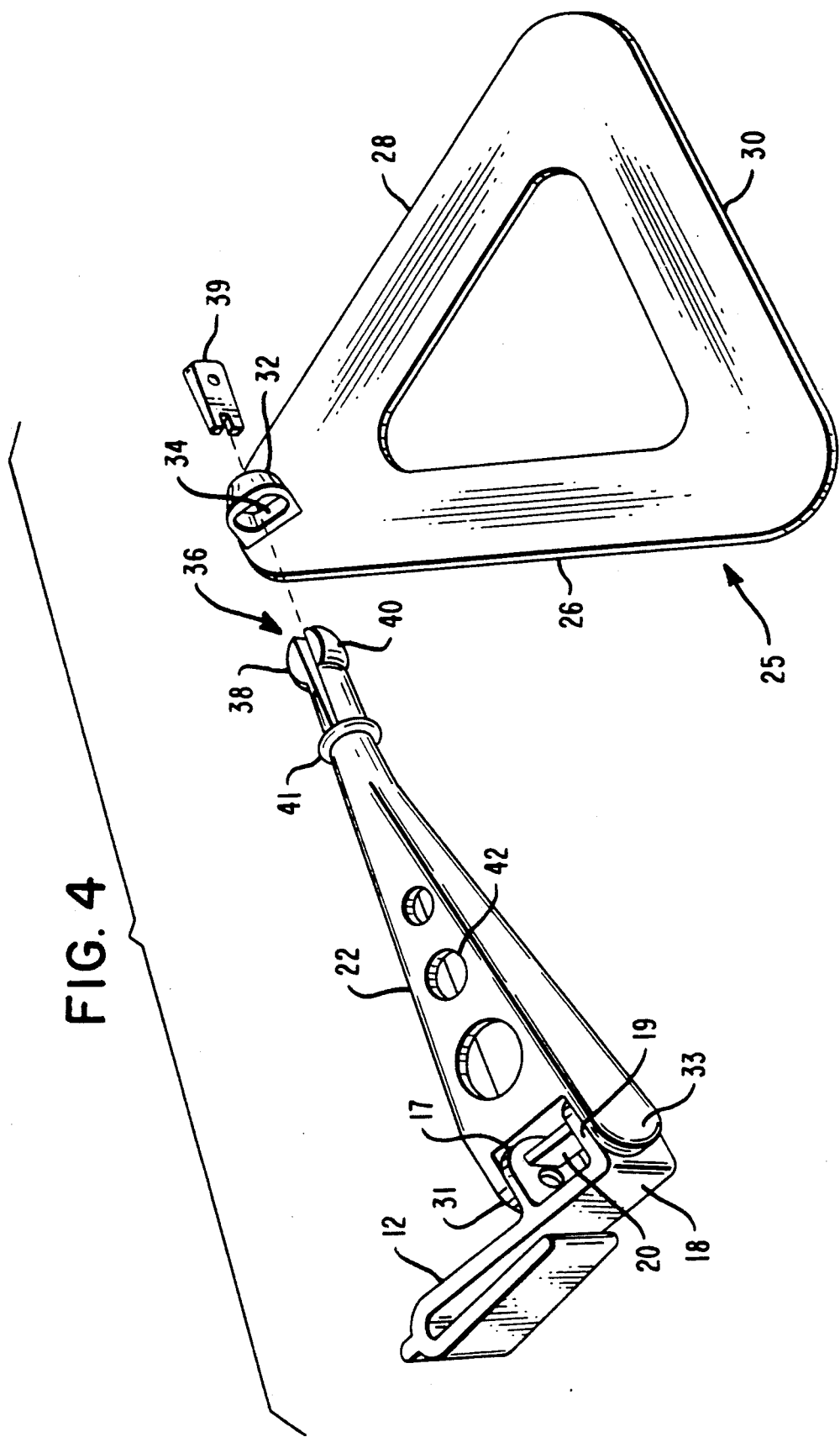
FIG. 4 is a perspective view showing the preferred sign in the assembly thereof.

A bearing block 32 is provided at the apex of the sign 25 and is formed as an integral part thereof, as shown in FIG. 4. The block 32 has an aperture 34 therethrough, the aperture 34 being formed in reducing dimension from one edge of the block 32, as seen by the inclined shape of the aperture 34 through the block (FIGS. 1 and 4). The shape of the aperture 34 changes from an elongated oval or like configuration at the inner edge (toward the right in FIG. 1 or toward the left in FIG. 4) of the block 32 to a generally circular configuration at the outer edge of the block. This configuration is provided to accommodate receiving of the U-shaped bracket 12 by vehicles having windows at different angles to allow the sign 25 to hang naturally downward. The oval shape of the aperture 34 at one end thereof also aids in the assembly of the arm 22 and the sign 25.

The aperture 34 is formed to receive a bifurcated end portion 36 of the arm 22 (FIGS. 1 and 4), such end portion 36 being in the shape of fingers 38 and 40. A wedge-shaped member 39 is inserted between the fingers 38 and 40 to lock the outer end portion 36 of the arm 22 in the aperture 34 by keeping the fingers in a spread condition after the end portion 36 is inserted through the aperture 34. The wedge-shaped member 39 thus prevents easy removal of the sign 25 from the arm 22. The bearing block 32 and the bifurcated end portion 36 provide for unrestricted or almost effortless pivoting or swinging of the sign 25. A ring portion 41 (FIG. 4) is adjacent but spaced from the end portion 36 of the arm 22. The ring portion 41 restricts excessive movement of the bearing member 32 of the sign 25 along the arm 22 while permitting limited movement of the sign therealong. The arm 22 has holes 42 of different sizes to reduce the weight of the arm and limit resistance to wind or air moving past the arm. The bearing surfaces of the aperture 34 and of the fingers 38 and 40 are sufficiently finished to enable the sign 25 to pivot or swing freely.

In the operation of the sign assembly 10, as shown in FIGS. 1 and 2, the support arm 22 and the sign 25 may be swung against the side of the vehicle 16 when use of the sign 25 is not desired. This situation may be when the vehicle 16 is on the open highway or when the vehicle is parked. In either or both of these situations, the sign assembly 10 may be removed from the window 14 and placed inside the vehicle 16. The sign assembly 10 is light in weight to enable easy removal thereof from the window 14.

When the sign assembly 10 is being used by the driver of the vehicle 16, the assembly 10 is placed in the position, as illustrated in FIG. 1. The sign 25 assumes the vertical position when the vehicle 16 is slowing down at a low speed of about five miles per hour or less, or is in a stopped condition. As the vehicle 16 starts to move to an operating speed of more than five miles per hour, the sign 25 swings upward to a nearly horizontal position by reason of air moving against the sign. The sign 25 thus pivots in the bearing block 32. Then, as the speed of the vehicle 16 slows down to about five miles per hour, the sign 25 swings downward to the vertical position, as shown in FIG. 1, to warn other motorists of such slowing condition. It is thus seen that the sign 25 assumes a vertical position at slow speeds or in the stopped condition of the vehicle 16. At higher speeds, the sign 25 swings upward by the air moving against the sign and the sign 25 assumes a horizontal position not readily seen by other motorists.

FIG. 4 is a perspective view of the caution sign 25 in the preferred embodiment thereof and viewing in the opposite direction from that of FIG. 1. FIG. 4 shows the assembly of the end portion 36 of the arm 22 through the bearing block 32 of the sign 25. The wedge-shaped member 39 is then inserted between the fingers 38 and 40 of the end portion 36 to lock the arm 22 in the aperture 34 of the bearing block 32 to prevent easy removal of the sign 25. The end portion 36 of the arm 22 has a small projection (not shown) at the juncture of the fingers 38 and 40 and adjacent the ring portion 41. This projection fits into a slot in the wedge-shaped member 39 to keep such member in place. Also, one of the fingers, as 40, has a small button on the inside surface thereof to fit into a hole in the wedge-shaped member 39 to help maintain such member when it is snapped into place between the fingers 38 and 40.

FIG. 1 shows the sign assembly 10 mounted on the driver or left side of the vehicle 16 and looking from the rear of the vehicle. The design of the sign 25 with the reflectors 35 on the rear side thereof provides a warning to drivers of vehicles behind the vehicle 16 with the sign. Of course, the sign assembly 10 could be mounted on the right side of a vehicle but this arrangement would not provide as good a warning to other drivers by reason that the refectors 35 would be on the front of the sign 25 and also the sign would be on the opposite side of a vehicle from the driver of a vehicle at the rear. However, the sign assembly 10 is made so that the sign 25 can be mounted in reverse manner from that shown in FIG. 4 and the reflectors would be facing toward the rear.

FIG. 3 is a modification of the support means for the sign 25 and shows an arm 48 along with one end portion 49 and the bifurcated end portion 36 coupled with the sign 25. A support member 50 (as a part of the vehicle) is provided as a lower support for a mirror 52 on a truck or like vehicle. An upper support (not shown) and the lower support member 50 hold the mirror 52 which may be pivoted on a rod 54. The end portion 49 of the arm 48 is placed onto the bottom end of the rod 54 against a bearing block 56 and a nut 58 secures the arm 48 in place on the rod 54. The outer end portion 36 of the arm 48 is of the same design and construction as the end portion of the arm 22 in FIG. 1. The sign 25 is the same in both embodiments of the sign assembly.

It is thus seen that herein shown and described is a safety or caution sign assembly or arrangement that is used to indicate a slowing or a stopped vehicle to other drivers or motorists in the immediate area. The sign 25 assumes either a vertical position or a horizontal position which is dependent upon air movement according to or relative to the speed of the vehicle. The sign 25 positions itself to a near horizontal position at a vehicle speed or a wind speed of about five miles per hour or greater and the sign 25 is not readily seen and thus not visible from the front or from the rear of the vehicle 16 by other motorists. When the vehicle 16 slows down to about five miles per hour or less or comes to a stop, the sign 25 swings to the vertical position and becomes fully visible to other motorists and indicates that the vehicle is not moving with the regular traffic. While a vehicle speed of about five miles per hour is generally adequate for the operation of the sign 25, any prevailing winds may have an effect on the sign so that a range of five to ten miles per hour of the vehicle 16 may be required for satisfactory operation.

The plastic sign 25 can withstand cold, wind, rain and heat and is made of a plastic that is strong, yet somewhat flexible, and is easily visible at low vehicle speeds or when the vehicle is stopped. The bracket 12 and the arm 22 (also arm 48) are made of Nylon which is available from du Pont, and the orange sign 25 is made of Lexan which is available from General Electric.

The caution sign assembly of the present invention enables the accomplishment of the objects and advantages mentioned above, and while a preferred embodiment and a modification of the assembly have been disclosed herein, other variations thereof may occur to those skilled in the art. It is contemplated that all such variations not departing from the spirit and scope of the invention hereof are to be construed in accordance with the following claims.

What is claimed is:

1. A caution sign for use on a vehicle comprising means for mounting the sign on the vehicle,
holding means coupled with said mounting means and extending outwardly therefrom,
first pivot means coupling said mounting means and said holding means, and
second pivot means secured to said sign and pivotally coupled with said holding means, said second pivot means comprising a bearing member defining an aperture of inclined shape therethrough, said sign being freely disposed in a generally vertical direction and supported by said bearing member and readily visible when said vehicle is not moving and said sign freely pivoting to a generally horizontal direction and supported by said bearing member when said vehicle is moving at a predetermined speed.

2. The caution sign of claim 1 wherein said first pivot means coupling said mounting means and said holding means includes bifurcated portions of said mounting means and said holding means.

3. The caution sign of claim 2 wherein said first pivot means includes an aperture and stud connection in said bifurcated portions which enables said sign to be swung to an inoperative position against said vehicle when said sign is not in use.

4. The caution sign of claim 1 where said first pivot means coupling said mounting means and said holding means includes spaced portions and wherein said second pivot means coupling said holding means and said sign includes a bearing block having an aperture therethrough and defining an enlarged aperture edge portion at one end thereof for enabling swinging of said sign from a generally vertical position when said vehicle is not moving to a generally horizontal position upon movement of said vehicle at said predetermined speed.

5. The caution sign of claim 1 wherein said second pivot means includes a bearing block having an aperture therethrough and defining a reduced aperture edge portion at one end thereof for supporting and enabling swinging of said sign to the generally horizontal position when said predetermined speed of said vehicle is at least five miles per hour.

6. The caution sign of claim 1 wherein said sign is triangular shaped and is pivotable at the apex thereof by means of said second pivot means from a vertical position to a horizontal position.

7. The caution sign of claim 1 wherein said mounting means and said holding means include detent means coupled for maintaining said sign in an outwardly direction upon movement of said vehicle.

8. The caution sign of claim 1 wherein said holding means includes a bifurcated end portion engageable with said second pivot means secured to said sign and having a finished surface to enable said sign to swing freely.

9. A sign assembly comprising a
sign member, means for mounting the sign member to the side of a vehicle, pivot means, holding means pivotally coupled with said mounting means by said pivot means and extending outwardly from the side of the vehicle, and bearing means secured to said sign member and coupled with said holding means, said bearing means comprising a bearing member defining an aperture of inclined shape therethrough, said sign member being freely disposed in a generally vertical position and supported by said bearing member and readily visible when said vehicle is not moving and said sign member freely swinging to a generally horizontal position and supported by said bearing member when said vehicle is moving at a predetermined speed.

10. The sign assembly of claim 9 wherein said sign member comprises a triangular-shaped plastic member.

11. The sign assembly of claim 9 wherein said mounting means comprises a U-shaped member for fitting onto a window of the vehicle.

12. The sign assembly of claim 9 wherein said mounting means comprises a support rod on said vehicle.

13. The sign assembly of claim 9 wherein said holding means comprises an arm fitting through and engaging said bearing member.

14. The sign assembly of claim 9 wherein said pivot means includes an aperture and stud connection coupling said mounting means and said holding means and enabling said sign member to be swung to an inoperative position against said vehicle when said sign member is not in use.

15. The sign assembly of claim 9 wherein said pivot means comprises first pivot means coupling said mounting means and said holding means and wherein said bearing means includes a bearing block having an aperture therethrough and comprises second pivot means coupled with said holding means and said sign member for enabling swinging of said sign member from a generally vertical position when said vehicle is not moving to a generally horizontal position upon movement of said vehicle at said predetermined speed.

16. The sign assembly of claim 9 wherein said mounting means and said holding means include detent means coupled for holding said sign member in an outwardly direction upon movement of said vehicle.

17. The sign assembly of claim 9 wherein said bearing means defines an aperture therethrough having a reduced aperture portion and said holding means includes a bifurcated end portion extending through said aperture and engageable with said reduced aperture portion.

18. The sign assembly of claim 9 wherein said bearing member defines an aperture of inclined shape therethrough and defines a reduced aperture portion engageable with said holding means and defines an enlarged aperture portion for permitting said mounting means to fit different vehicles.

19. In a caution sign for use on a vehicle, means for mounting the sign on the vehicle and holding means pivotally connected with said mounting means and extending outwardly from the vehicle, the improvement comprising bearing means secured to the sign and pivotally coupled with said holding means, said bearing means comprising a bearing member defining an aperture of inclined shape therethrough for receiving and for supporting said holding means, said sign being freely disposed in a generally vertical position and supported by said bearing member and readily visible when said vehicle is not moving and said sign freely swinging to a generally horizontal position and supported by said bearing member when said vehicle is moving at a predetermined speed.

* * * * *